US010864632B2

(12) United States Patent
Watanabe et al.

(10) Patent No.: US 10,864,632 B2
(45) Date of Patent: Dec. 15, 2020

(54) DIRECT TEACHING METHOD OF ROBOT (71) Applicant: KAWASAKI JUKOGYO KABUSHIKI KAISHA, Kobe (JP)

(72) Inventors: Masayuki Watanabe, Kobe (JP); Masayuki Nishimura, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 302 days.

(21) Appl. No.: 15/778,827

(22) PCT Filed: Nov. 2, 2016

(86) PCT No.: PCT/JP2016/004791
§ 371 (c)(1),
(2) Date: May 24, 2018

(87) PCT Pub. No.: WO2017/090235
PCT Pub. Date: Jun. 1, 2017

(65) Prior Publication Data
US 2018/0345492 A1 Dec. 6, 2018

(30) Foreign Application Priority Data
Nov. 24, 2015 (JP) .................. 2015-228685

(51) Int. Cl.
*B25J 9/16* (2006.01)
*G05B 19/42* (2006.01)
(Continued)

(52) U.S. Cl.
CPC .............. *B25J 9/163* (2013.01); *B25J 5/007* (2013.01); *B25J 9/009* (2013.01); *B25J 9/0081* (2013.01);
(Continued)

(58) Field of Classification Search
CPC ........ G05B 19/423; G05B 2219/36454; G05B 2219/39101; G05B 2219/39109;
(Continued)

(56) References Cited

U.S. PATENT DOCUMENTS 5,596,683 A * 1/1997 Kasagami .............. B25J 9/1682
700/248
6,385,508 B1 * 5/2002 McGee .................. B25J 9/0081
285/189
(Continued)

FOREIGN PATENT DOCUMENTS

JP        H04-92905 A    3/1992
JP        H05-285870 A   11/1993
(Continued)

OTHER PUBLICATIONS

Machine Translation of KR101193211, accessed May 13, 2020 (Year: 2012).*

Primary Examiner — Ryan Rink
(74) Attorney, Agent, or Firm — Oliff PLC (57) ABSTRACT A direct teaching method of a robot includes specifying one of a plurality of robot arms as a master arm and specifying as a slave arm at least one of the robot arms which is other than the master arm; causing the slave arm to operate cooperatively with the master arm so that relative positions and postures of a wrist part of the master arm and a wrist part of the slave arm become a predetermined relation, while a teaching person is directly applying a force to an arbitrary location of the master arm including a tool, to move the master arm to a desired teaching position; and storing position information of at least one of the master arm and the slave arm at a time point when the master arm has reached the desired teaching position.

10 Claims, 5 Drawing Sheets (51) Int. Cl.
  *B25J 9/00* (2006.01)
  *B25J 5/00* (2006.01)
  *B25J 9/04* (2006.01)
  *G05B 19/423* (2006.01)

(52) U.S. Cl.
  CPC ............. *B25J 9/0087* (2013.01); *B25J 9/044* (2013.01); *B25J 9/1664* (2013.01); *B25J 9/1669* (2013.01); *B25J 9/1682* (2013.01); *B25J 9/1692* (2013.01); *G05B 19/42* (2013.01); *G05B 19/423* (2013.01); *G05B 2219/36401* (2013.01)

(58) Field of Classification Search
  CPC . G05B 2219/39136; G05B 2219/39139; B25J 9/0081; B25J 9/1682
  See application file for complete search history.

(56) References Cited

U.S. PATENT DOCUMENTS

| | | | |
|---|---|---|---|
| 2005/0222714 A1 | 10/2005 | Nihei et al. | |
| 2008/0319557 A1* | 12/2008 | Summers | G05B 19/4015 700/19 |
| 2013/0011220 A1* | 1/2013 | Jacobsen | B25J 5/005 414/2 |
| 2014/0277740 A1* | 9/2014 | Adelman | B25J 9/1682 700/260 |
| 2016/0199975 A1* | 7/2016 | Brooks | G05B 19/427 700/248 |
| 2017/0136621 A1* | 5/2017 | Benaim | G06F 3/013 |
| 2019/0358817 A1* | 11/2019 | Ghazaei Ardakani | B25J 13/025 |

FOREIGN PATENT DOCUMENTS

| | | |
|---|---|---|
| JP | H05-303425 A | 11/1993 |
| JP | H07-24757 A | 1/1995 |
| JP | H09-141580 A | 6/1997 |
| JP | H09-174470 A | 7/1997 |
| JP | 2667153 B2 | 10/1997 |
| JP | H11-042575 A | 2/1999 |
| JP | H11-231940 A | 8/1999 |
| JP | 2000-084878 A | 3/2000 |
| JP | 2003-25264 A | 1/2003 |
| JP | 2005-293098 A | 10/2005 |
| JP | 2010-120124 A | 6/2010 |
| KR | 101193211 B1 | 10/2012 |

* cited by examiner

DIRECT TEACHING METHOD OF ROBOT

TECHNICAL FILED

The present invention relates to a direct teaching method of a robot including a plurality of robot arms.

BACKGROUND ART

Conventionally, operation programs for an industrial robot are created by teaching performed for the robot, and the robot has a teaching playback function. As one example of the above-described teaching method of the industrial robot, a direct teaching method is known. In the direct teaching method, teaching is performed in such a way that a teaching person manually moves a robot arm to a teaching position, and the robot stores therein position information (namely, teaching position) of a position sensor. Patent Literature 1 discloses a technique relating to such teaching performed for the robot.

In a direct teaching method robot disclosed in Patent Literature 1, a force sensor for detecting a force applied to a wrist part is attached on the wrist part, a robot operates by a compliance control in which a detection signal of the force sensor is an input, the robot is moved by a teaching person's application of a force to a tool, the tool is positioned to a desired position by the teaching person's manual operation, and position information is input to the robot. As the movement of the tip end of the tool of this robot, a free motion in which the motion of the robot is not restricted or a restricted motion in which the motion of the robot is restricted on a particular straight line or plane can be selected.

In some cases, a multi joint robot system in which a plurality of robots work in cooperation is constructed. The cooperative work of the plurality of robots includes operations performed by the plurality of robots while avoiding a collision between them, operations performed by the plurality of robots to handle a target object, or the like.

CITATION LIST

Patent Literature

Patent Literature 1: Japanese-Laid Open Patent Application Publication No. Hei. 9-141580

SUMMARY OF INVENTION

Technical Problem

In the technique disclosed in Patent Literature 1, an external force applied to the wrist part or the tool is detected or estimated, and the robot operates to move the tool according to the external force. To this end, the robot includes the force sensor, and a control becomes complicated. Since the robot operates based on the detected external force, it is difficult to finely adjust the position of the robot arm or the tool in a case where the teaching person directly applies a force to the robot arm or the tool to move it.

Typically, in the direct teaching work for the robot, it is assumed that teaching is performed for each of the robot arms. In a case where teaching is directly performed for the plurality of robot arms, precise adjustment of the relative positions and postures of the plurality of robot arms require expertise and is very complicated, because it is difficult to finely adjust the position of one robot arm as described above.

The present invention has been developed in view of the above-described circumstances, and an object of the present invention is to propose a technique which allows a teaching work to be easily performed for a robot including a plurality of robot arms, in a case where teaching is directly performed for the plurality of robot arms while operating the plurality of robot arms in association with each other.

Solution to Problem

According to one aspect of the present invention, there is provided a direct teaching method of a robot (direct teaching method for a robot, method of direct teaching of a robot, method of directly teaching a robot), the robot including a plurality of robot arms, the direct teaching method comprising: specifying one of the plurality of robot arms as a master arm and specifying as a slave arm at least one of the plurality of robot arms which is other than the master arm; causing the slave arm to operate cooperatively with the master arm so that relative positions and postures of a wrist part of the master arm and a wrist part of the slave arm become a predetermined relation, while a teaching person is directly applying a force to an arbitrary location of the master arm including a tool, to move the master arm to a desired teaching position; and storing position information of the master arm and position information of the slave arm at a time point when the master arm has reached the desired teaching position.

In accordance this direct teaching method of the robot, according to the movement of the master arm being directly moved by the teaching person, the slave arm automatically operates cooperatively with the master arm so that the relation of relative positions and postures of the wrist part of the master arm and the wrist part of the slave arm are maintained as the predetermined relation. This makes it possible to omit a work which is complicated and requires expertise to adjust the relative positions and postures of the plurality of robot arms, in the teaching work for the plurality of robot arms. As a result, the teaching work is simplified. Further, since the teaching person can see the relation of the positions and postures of the robot arms, the teaching person can easily check the state of the robot arms.

Advantageous Effects of Invention

In accordance with the present invention, a teaching work can be easily performed for a robot including a plurality of robot arms, in a case where teaching is directly performed for the plurality of robot arms while operating the plurality of robot arms in association with each other.

DESCRIPTION OF EMBODIMENTS

Now, the embodiment of the present invention will be described with reference to the drawings. A multi-joint (articulated) robot (hereinafter will also be simply referred to as "robot 1") according to the embodiment of the present invention is used in a production factory in which electric and electronic components, and the like are assembled into products by a line production method or a cell production method, is placed along a work table provided in the production factory, and is able to perform at least one of work operations such as transfer, mounting of parts, changing positions, and changing postures, for workpieces placed on the work table. Note that the embodiment of the robot of the present invention is not limited to the above, and is widely applicable to multi-joint robots including a horizontal multi joint (articulated) robot, and a vertical multi-joint (articulated) robot.

Figure 1:
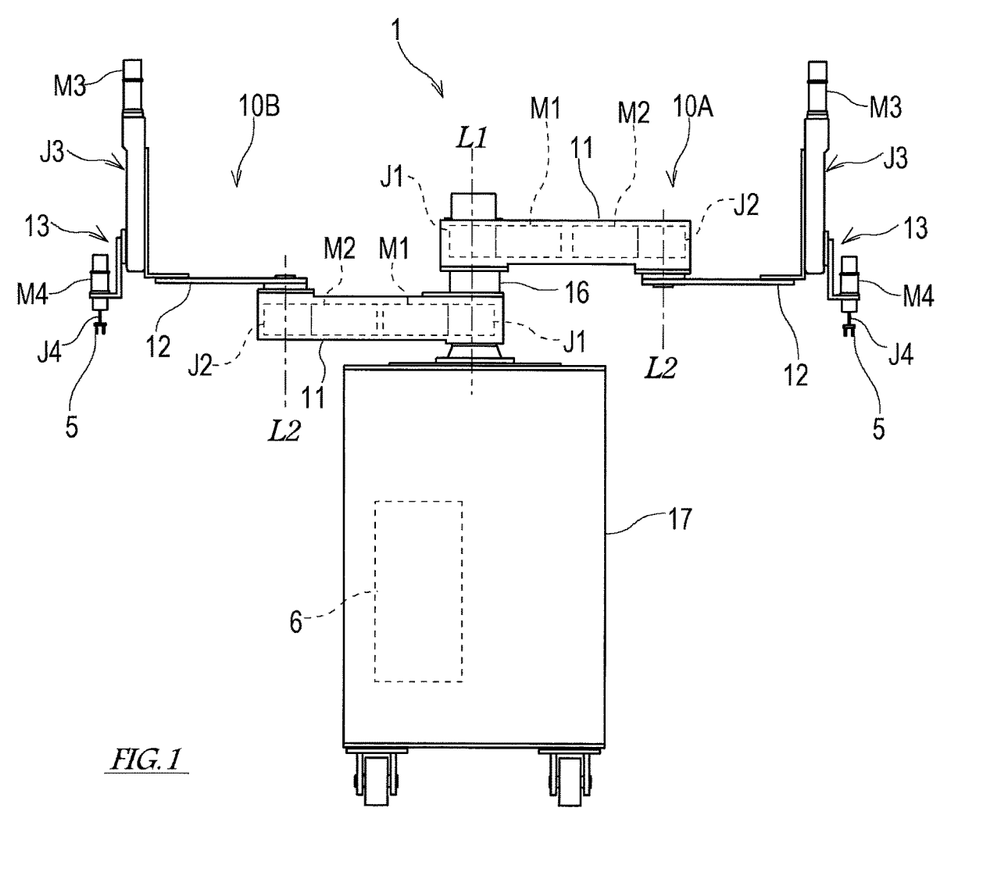
FIG. 1 is a schematic front view showing the overall configuration of a multi-joint robot (articulated robot) according to an embodiment of the present invention.
Figure 2:
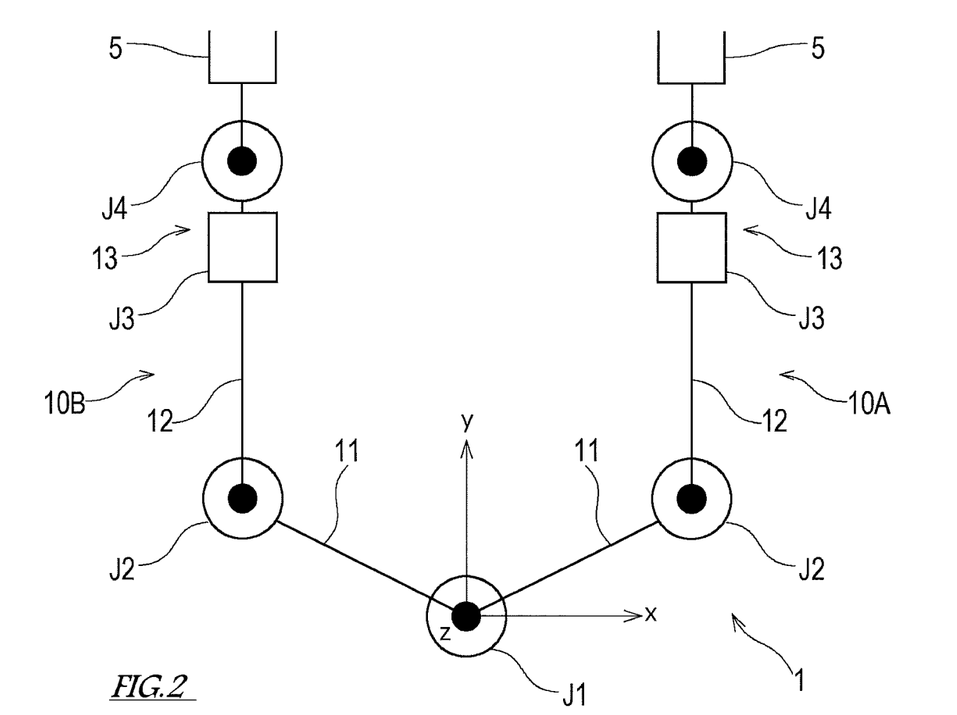
FIG. 2 is a schematic plan view of the robot.

Initially, the schematic configuration of the robot 1 will be described. FIG. 1 is a front view showing the overall configuration of the robot 1 according to the embodiment of the present invention. FIG. 2 is a schematic plan view of the overall configuration of the robot 1. As shown in FIGS. 1 and 2, the robot 1 includes a carrier 17, a pair of robot arms (hereinafter will be simply referred to as "arms") 10A, 10B supported on the carrier 17, tools 5 (end effectors) attached on the tip ends of the arms 10A, 10B, respectively, and a controller 6 which controls the operations of the arms 10A, 10B and the tool 5.

The robot 1 according to the embodiment is a dual-arm robot including the right and left arms 10A, 10B. The right and left arms 10A, 10B are able to operate independently of each other or in association with each other. The right and left arms 10A, 10B have substantially the same structure. In a case where the right and left arms 10A, 10B are not distinguished from each other, they are expressed as "arms 10" with alphabets omitted.

Each of the arms 10 is a horizontal multi-joint (articulated) robot arm. Each of the arms 10 includes a first link 11, a second link 12, and a wrist part 13 including a mechanical interface on which the tool 5 is mounted, the first link 11, the second link 12, and the wrist part 13 being coupled to each other in series.

The first link 11 is coupled to a base shaft 16 secured to the upper surface of the carrier 17 via a rotation joint. The first link 11 is rotatable around (about) a vertical rotational axis L1 passing through the center axis of the base shaft 16. The second link 12 is coupled to the tip end of the first link 11 via the rotation joint. The second link 12 is rotatable around a vertical rotational axis L2 defined at the tip end of the first link 11.

The wrist part 13 is coupled to the tip end of the second link 12 via a linear joint and the rotation joint. The wrist part 13 is movable up and down by the linear joint, with respect to the second link 12. The wrist part 13 is rotatable around a rotational axis perpendicular to the second link 12, by the rotation joint.

The arm 10 having the above-described configuration includes four control shafts J1 to J4 provided to correspond to the joints, respectively. The arm 10 is provided with driving servo motors M1 to M4, respectively, and encoders E1 to E4 (see FIG. 4) which detect the rotation angles of the servo motors M1 to M4, the servo motors M1 to M4 and the encoders E1 to E4 corresponding to the control shafts J1 to J4, respectively. In a case where the control shafts J1 to J4 are not particularly distinguished from each other, they are expressed as "control shafts J" with numeric characters omitted. In a case where the servo motors M1 to M4 are not particularly distinguished from each other, they are expressed as "servo motors M" with numeric characters omitted. In a case where the encoders E1 to E4 are not particularly distinguished from each other, they are expressed as "encoders E" with numeric characters omitted.

The rotational axes L1 of the first links 11 of the two arms 10A, 10B having the above-described configuration are located on the same straight-line. The first link 11 of the arm 10A and the first link 11 of the arm 10B are disposed with a vertical level difference. An origin of a base coordinate system of the robot 1 is defined on the rotational axes L1 of the robot 1. This makes it possible to easily perform a control and a calculation to allow the two arms 10A, 10B to operate in association with each other.

Figure 3:
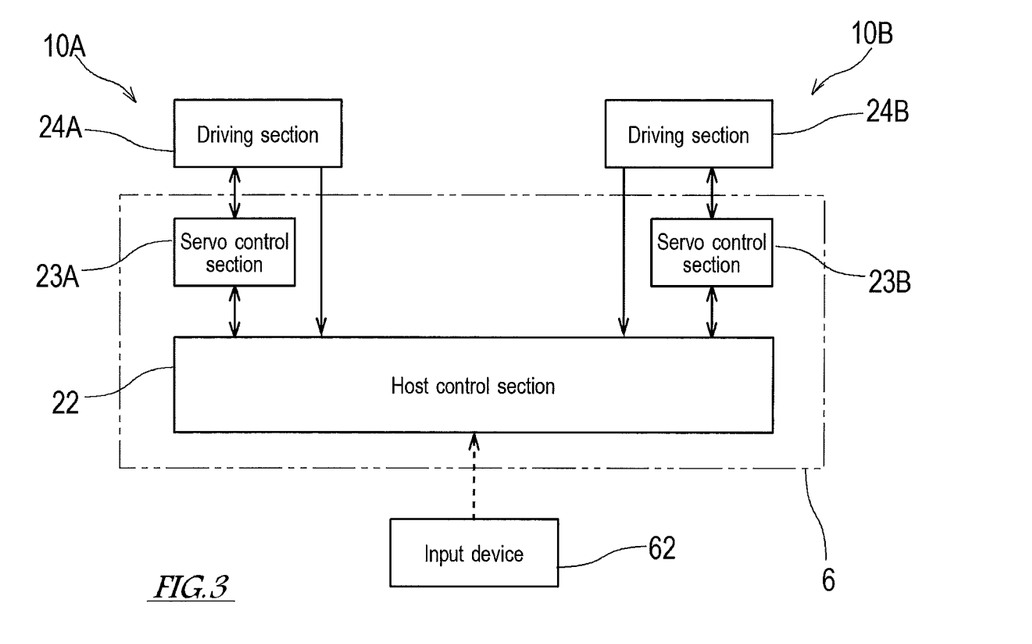
FIG. 3 is a diagram showing the schematic configuration of a control system of the robot.
Figure 4:
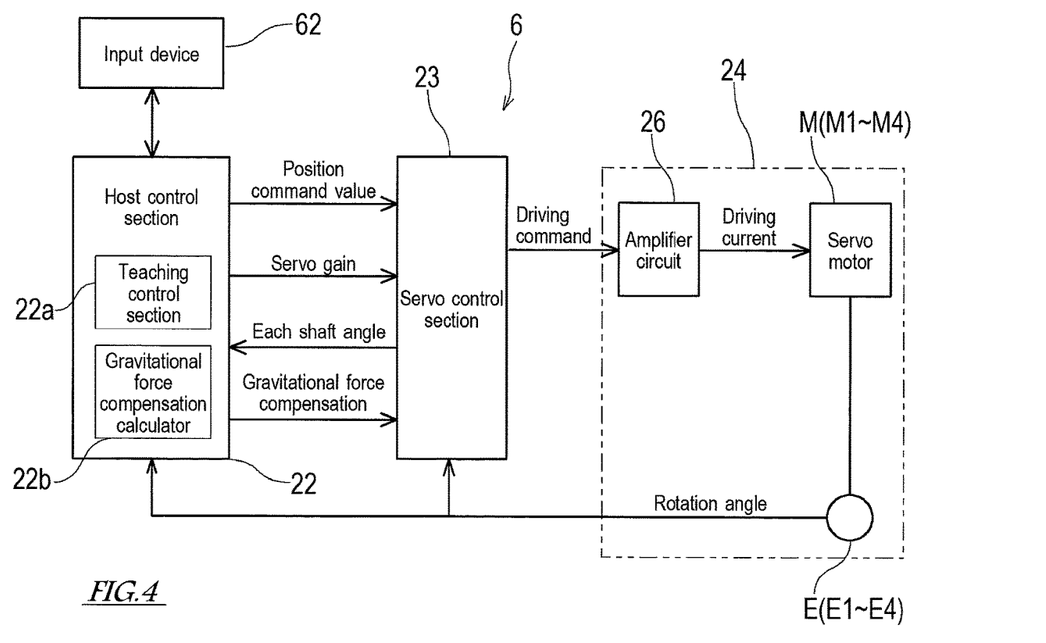
FIG. 4 is a diagram showing the schematic configuration of the control system of the robot.

Next, the controller 6 will be described. The controller 6 is configured to control a normal operation and a teaching operation of the robot 1. FIGS. 3 and 4 are diagrams showing the schematic configuration of a control system of the robot 1. Since the control systems of the right and left arms 10A, 10B have substantially the same configuration, the configuration of the control system of one of the arms 10 is shown in detail in FIG. 4.

As shown in FIGS. 3 and 4, the controller 6 includes a host control section 22, servo control sections 23A, 23B corresponding to the arms 10A, 10B, respectively, and driving sections 24A, 24B corresponding to the arms 10A, 10B, respectively. Although in the present embodiment, one host control section 22 is configured to control the operations of the two arms 10A, 10B, host control sections may be provided to correspond to the two arms 10A, 10B, respectively. The two servo control sections 23A, 23B have substantially the same configuration. In a case where the servo control sections 23A, 23B are not particularly distinguished from each other, they are expressed as "servo control sections 23" with alphabets omitted. The two driving sections 24a, 24B have substantially the same configuration. In a case where the driving sections 24a, 24B are not particularly distinguished from each other, they are expressed as "driving sections 24" with alphabets omitted.

The driving sections 24 are provided to correspond to the control shafts J1 to J4, respectively, of the arm 10. In FIG. 4, one of the four driving sections 24, provided to correspond to one arm 10 is shown in detail, and the other driving sections 24 are not shown. The servo control section 23 is connected to each of the driving sections 24. The host control section 22 is connected to the servo control section 23. These sections constitute the controller 6.

As an input device 62 used to input an operation command to the host control section 22, a tablet computer having a graphical interface is used. The input device 62 is wirelessly communicable with the controller 6. A command input to the input device 62 by a teaching person (operator) is input to the controller 6. The input device 62 also functions as a teaching pendant which is an input device used to input a command to the controller 6 to teach the robot 1.

The controller 6 is a computer, and includes a processor section such as CPU, and a memory section such as ROM and RAM (none of these are shown). The memory section contains therein programs to be executed by the processor section, fixed data, or the like. The processor section transmits and receives data to and from, for example, an external device such as the input device 62. The processor section receives detection signals as inputs from sensors and outputs control signals to targets to be controlled. The controller 6 performs processing to control the operations of the robot 1 in such a manner that the processor section reads software such as the programs stored in the memory section and executes the software. In particular, the host control section 22 of the controller 6 has at least a function as a teaching control section 22a which performs processing to control the operations of the robot 1 in a case where the teaching is performed for the robot 1. Note that the controller 6 may be a single computer configured to perform processing by a centralized control, or a plurality of computers configured to cooperatively perform processing by a distributed control. Further, the controller 6 may be constituted by a micro controller, a programmable logic controller (PLC), or the like.

The host control section 22 generates position command values and outputs the position command values to the servo control section 23. The servo control section 23 generates driving command values (torque command values) based on the position command values received from the host control section 22, and outputs the driving command values to amplifier circuits 26. The amplifier circuits 26 supply driving currents corresponding to the received driving command values, to the servo motors M, respectively. The servo motors M are provided with the encoders E, respectively, which detect output rotation angles or the like of the servo motors M. The rotation angles detected by the encoders E are sent to the host control section 22 and the servo control section 23.

Figure 5:
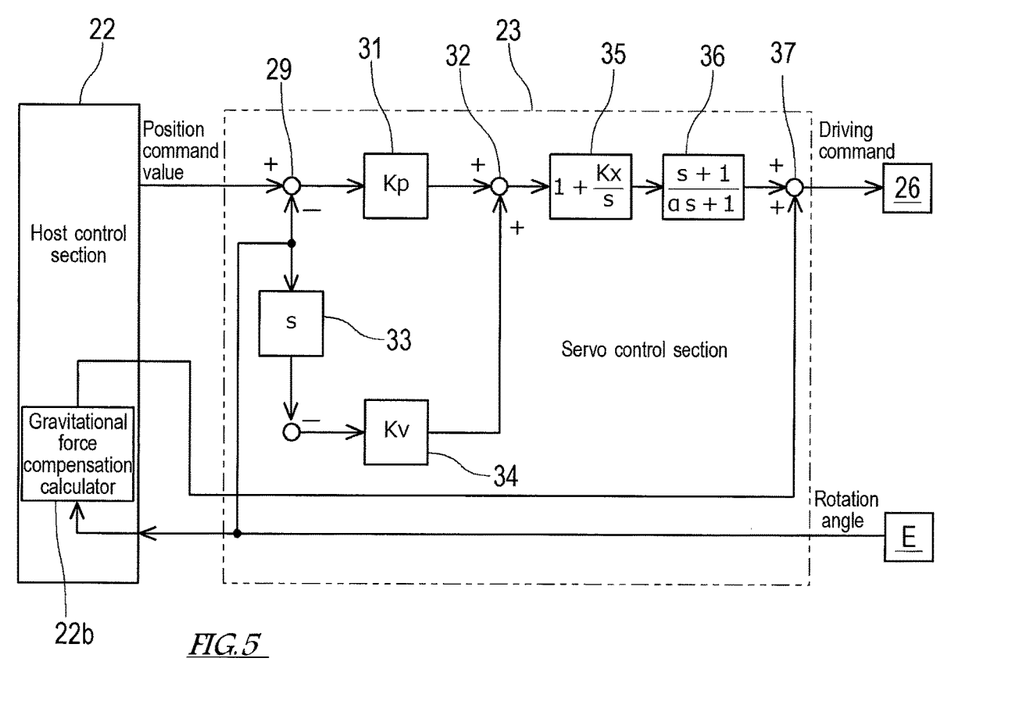
FIG. 5 is a diagram showing a specific electric configuration including a servo control section as a major constituent.

FIG. 5 is a diagram showing a specific electric configuration including the servo control section 23 as a major constituent. As shown in FIG. 5, when each of the position command values is output from the host control section 22 and input to the servo control section 23, this position command value is provided to a plus input of a subtracter 29. A signal indicative of the rotation angle detected by the encoder E is provided to a minus input of the subtracter 29. The subtracter 29 subtracts the rotation angle from the position command value.

The signal output from the subtracter 29 is provided to a coefficient unit 31. The coefficient unit 31 amplifies the signal by use of a position gain Kp and outputs the resulting signal to one of inputs of an adder 32. A differentiation circuit 33 differentiates the rotation angle from the encoder E, and outputs the resulting signal to a coefficient unit 34. The coefficient unit 34 amplifies the signal by use of a speed gain Kv, and outputs the resulting signal to the other of the inputs of the adder 32. The signal output from the adder 32 is provided to an integrator 35. The integrator 35 integrates the signal. A gain G1 of the integrator 35 is indicated by the following formula (1). In formula (1), Kx is a constant, and s is an operator.

$$G1 = 1 + \frac{Kx}{s} \quad (1)$$

The signal output from the integrator 35 is provided to a phase compensator 36. The phase compensator 36 performs calculation of phase compensation during a phase control operation. A gain G2 of the calculation of the phase compensation of the phase compensator 36 is indicated by the following formula (2). In formula (2), α is a constant.

$$G2 = \frac{s+1}{\alpha s + 1} \quad (2)$$

The signal output from the phase compensator 36 is provided to one of inputs of an adder 37. The signal (gravitational force compensation value) output from a gravitational force compensation calculator 22b which responds to the signal output from the encoder E is provided to the other input of the adder 37. The adder 37 performs addition of the signals. The resulting signal is input to the amplifier circuit 26 as the driving command value.

In the arm 10 according to the present embodiment, a load caused by the gravitational force is exerted on the third control shaft J3 of the plurality of control shafts J3. For this reason, in the control system of the third control shaft J3, the host control section 22 includes the gravitational force compensation calculator 22b. In the control systems of the other control shafts, the host control section 22 does not include the gravitational force compensation calculator 22b, or the output signal is zero in a case where the host control section 22 includes the gravitational force compensation calculator 22b. The gravitational force compensation calculator 22b calculates the gravitational force compensation value according to a calculation formula which is pre-stored, based on the rotation angle of the third control shaft J3 which is detected by the encoder E. Thus, in the control system of the third control shaft J3, the driving command value output from the servo control section 23 contains the gravitational force compensation value output from the gravitational force compensation calculator 22b. As a result, the driving section 24 of the third control shaft J3 operates to generate gravitational force compensation torque.

Control for Direct Teaching

Now, the flow of processing performed by the controller 6 during a teaching operation of the robot 1 will be described. Initially, the teaching person inputs information associated with teaching to the controller 6 by use of the input device 62.

For example, a single operation teaching/cooperative operation teaching select image is displayed on the input device 62, to select a single operation teaching for teaching one of the two arms 10A, 10B singly, or a cooperative operation teaching for teaching the two arms 10 in association with each other so that the two arms 10A, 10B operate cooperatively. In a case where a command for selecting the single operation teaching is input on the single operation teaching/cooperative operation teaching select image, then, an arm select image is displayed on the input device 62 to select which of the two arms 10A, 10B teaching should be performed for. In contrast, in a case where a command for selecting the cooperative operation teaching is input on the single operation teaching/cooperative operation teaching select image, then, an arm select image is displayed on the input device 62 to select which of the two arms 10A, 10B is selected as a master arm 10M. On the arm select images, one of the two arms 10A, 10B can be selected.

Then, a teaching method select image is displayed on the input device 62, to select a teaching method. The teaching person can select on the teaching method select image, one of a plurality of teaching methods including a remote operation teaching which uses the input device 62 as a teaching pendant, and a direct teaching. In a case where the direct teaching is selected, an arm movement mode select image is displayed on the input device 62, to select an arm movement mode. The teaching person can select on this arm movement mode select image, a free mode in which a specified standard point K defined in the arm 10 or the tool 5 moves freely, or a restriction mode in which a movement path of the standard point K is restricted to a movement path on a specified straight line, on a specified plane, or around a specified axis. For example, the standard point K is defined as an arbitrary point such as a representative point of the tool or a wrist standard point which is defined in a mechanical interface coordinate system of the wrist part 13. In a case where the restriction mode is selected, a restricted movement specifying image is displayed on the input device 62. The teaching person can select on this restricted movement specifying image, the straight line, the plane or the axis on which the standard point K of the arm 10 moves under restriction.

Figure 6:
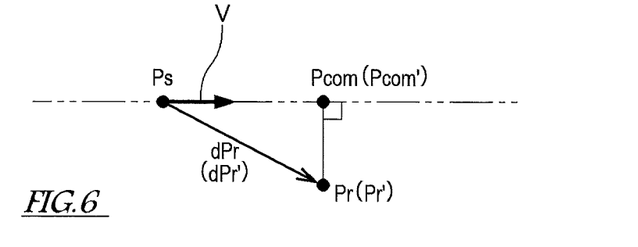
FIG. 6 is a conceptual view for explaining a movement of a standard point of a robot arm.

Hereinafter, an example of a flow of processing performed by the controller 6 during cooperative operation/restriction mode/direct teaching operation of the two arms 10A, 10B will be described. In this example, it is assumed that one of the two arms 10A, 10B is the master arm 10M, the other of the two arms 10A, 10B is a slave arm 10S, and the standard point K is defined in the tip end of the master arm 10M. As shown in FIG. 6, the movement path of the standard point K is restricted to a direction parallel to a movement vector V from an initial position $P_s$. Then, the teaching person directly applies a force to the master arm 10M or the tool 5 of the master arm 10M to move the standard point K from the initial position $P_s$ along a predetermined movement path indicated by two-dot chain line of FIG. 6, while keeping an initial posture S of the tool 5 at the initial position $P_s$.

During the teaching performed for the robot 1, the gains of the positions and speeds of the control shafts J whose operations are permitted, among the control shafts J of the master arm 10M, are set to sufficiently small values. For this reason, when the teaching person applies an external force to the master arm 10M or the tool 5 to move the master arm 10M, the standard point K is displaced. When the encoder E detects this displacement, the host control section 22 derives a target position $P_{com}$ obtained by projecting this displacement of the standard point K to the predetermined movement path, namely, target position $P_{com}$ obtained by replacing a present position Pr of the standard point K by only a direction component included in the predetermined movement path. The host control section 22 generates a master arm position command value $T_{com}$ corresponding to the target position $P_{com}$ and outputs the master arm position command value $T_{com}$ to the servo control section 23. Hereinafter, the flow of processing performed by the host control section 22 of the controller 6 will be described with reference to FIG. 8.

Figure 8:
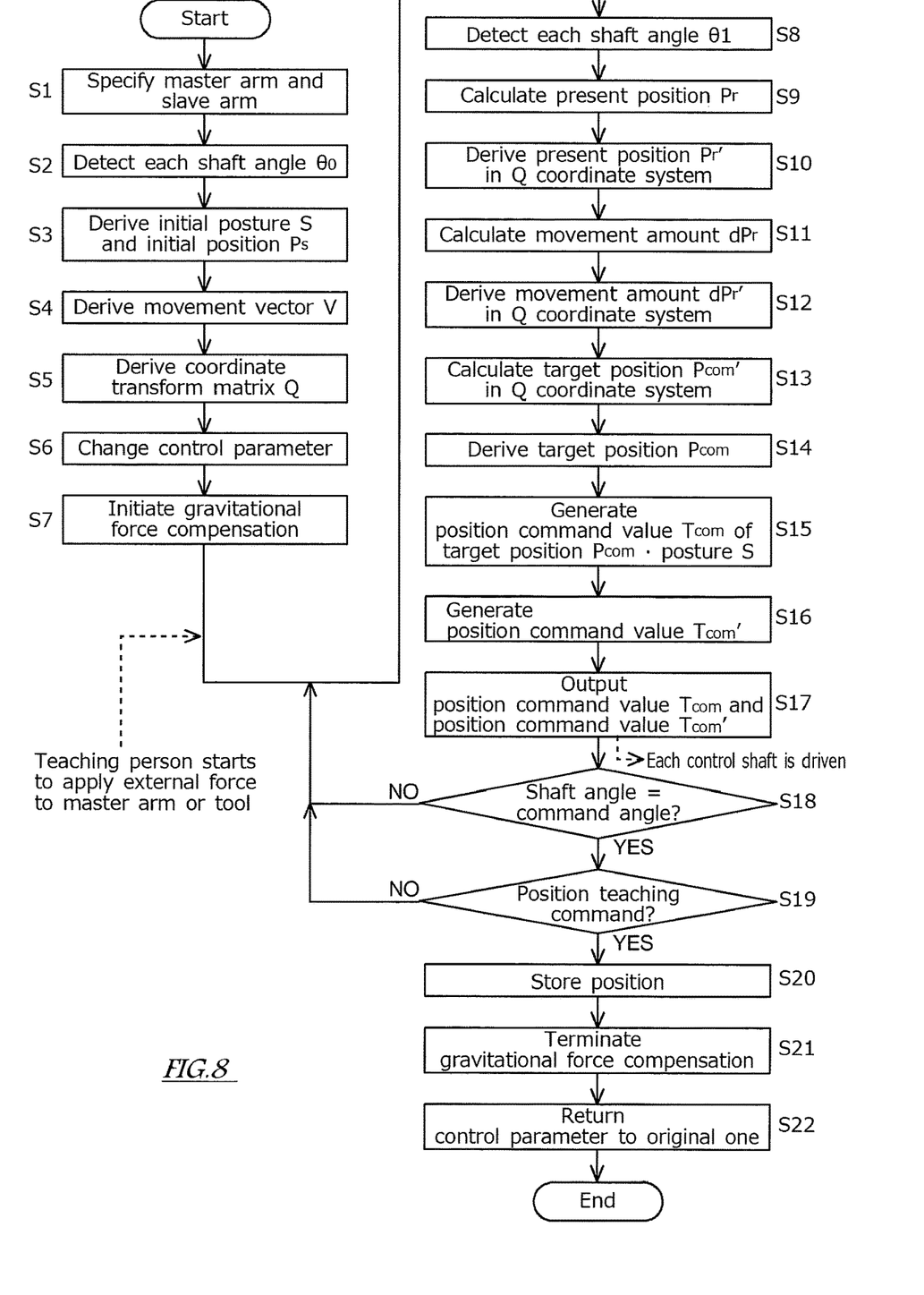
FIG. 8 is a flowchart showing processing performed by a controller during a direct teaching operation.

As described above, the information associated with the teaching which is input to the input device 26 is sent to the controller 6. The host control section 22 obtains these information, and initiates the calculation for generating the position command value $T_{com}$. The information associated with the teaching includes the select information of the master arm 10M, and restricted movement information such as the straight line, the plane or the axis on which the standard point K moves under restriction.

Initially, the host control section 22 specifies as the master arm 10M one of the two arms 10A, 10B which is selected, based on the information input on the arm select image, and specifies the other arm as the slave arm 10S (step S1). Then, the host control section 22 obtains the rotation angle of each of the control shafts J from the encoder E of the master arm 10M, and detects an initial shaft angle $\theta_0$ of each of the control shafts J based on the rotation angle (step S2). Then, the host control section 22 derives the initial position $P_s$ of the standard point K in a base coordinate system and the initial posture S of the tool 5, based on the shaft angles $\theta_0$ of the master arm 10M. Further, the host control section 22 derives a posture rotation matrix R ($\theta_0$) representing the initial position $P_s$ and the posture S of the master arm 10M (step S3).

Then, the host control section 22 calculates the movement vector V (Step S4). The movement vector V is a unit vector indicating a permitted movement direction of the standard point K. The controller 6 derives the movement vector V based on the obtained restricted movement information (information for specifying the movement path such as the straight line, the plane or the axis on which the standard point K moves under restriction). For example, in a case where the movement path of the standard point K is restricted to a movement path on a certain straight line, the movement vector V is a unit vector parallel to this straight line.

The host control section 22 calculates a coordinate transform matrix Q by use of, for example, the posture rotation matrix R ($\theta_0$) (step S5). The coordinate transform matrix Q is a matrix used to transform coordinates in the base coordinate system into coordinates in a new Q coordinate system. The coordinate transform matrix Q is preferably a matrix representing transform which causes the movement vector V to become parallel to one of three orthogonal axes x', y', z' in the Q coordinate system, for example, x'-axis.

Figure 7:
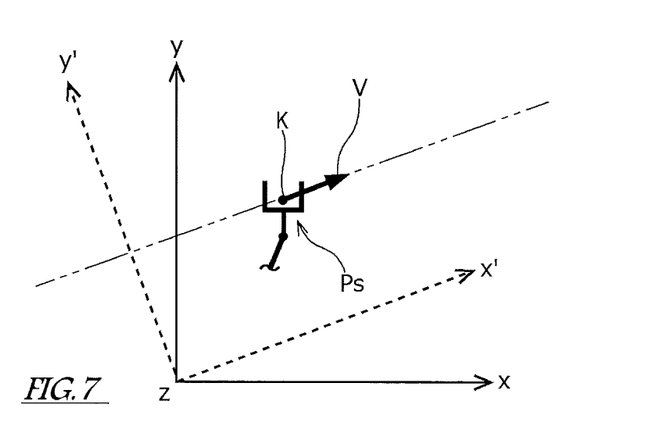
FIG. 7 is a view for explaining coordinate transform by use of a coordinate transform matrix Q.

FIG. 7 is a view for explaining the coordinate transform by use of the coordinate transform matrix Q. As shown in FIG. 7, the coordinate transform matrix Q is the matrix which performs transform to cause the movement vector V to become parallel to the x'-axis obtained by transforming the x-axis in the base coordinate system into the Q coordinate system. In a case where the movement vector V is parallel to one of the three orthogonal axes x', y', z' in the Q coordinate system, in this way, calculation in the Q coordinate system is easily carried out.

Then, the host control section 22 changes the values of the control parameters in the servo control section 23 (step S6). Specifically, regarding each of the control shafts J whose operations are permitted, among the control shafts J of the master arm 10M, the host control section 22 sets the position gain Kp of the coefficient unit 31 and the speed gain Kv of the coefficient unit 34 in the servo control section 23, to sufficiently small values, sets the gain Kx of the integrator 35 in the servo control section 23 to zero, clears the content of this integrator 35 in the servo control section 23, and disenables the function of the phase compensator 36 in the servo control section 23. In brief, the signal output from the adder 32 is directly provided to the adder 37. The host control section 22 may change the values of the control parameters (step S6), in a period from a point after step S1 to a point before step S8 which will be described later. The order of the steps is not limited to that of the present embodiment.

Then, the host control section 22 initiates the gravitational force compensation for the control shaft J which requires the gravitational force compensation (step S7). In the present embodiment, the host control section 22 initiates the calculation of the gravitational force compensation in the control system of the servo motor M3 which drives the control shaft J3.

The teaching person directly applies a force to an arbitrary location of the master arm 10M or the tool 5 of the master arm 10M to move the master arm 10M so that the standard point K is moved gradually to a desired teaching point. During this movement, the position of the standard point K changes continuously. The movement path of the standard point K is restricted to the predetermined movement path, and each of the control shafts J of the master arm 10M operates to assist the force applied to the master arm 10M or the tool 5 by the teaching person.

In step S8, the host control section 22 detects a shaft angle $\theta_1$ of each of the control shafts J of the master arm 10M at a time point when the standard point K is displaced. The host control section 22 calculates the present (current) position $P_r$ of the standard point K in the base coordinate system, based on the detected shaft angle $\theta_1$ of each control shaft J (step S9). Then, in step S10, the host control section 22 transforms the coordinates of the calculated present position $P_r$ of the standard point K into the coordinates of a present position $P_r'$ of the standard point K in the Q coordinate system ($P_r'=Q \cdot P_r$).

In step S11, the host control section 22 derives a movement amount $dP_r$ of the standard point K in the base coordinate system, based on the calculated present position $P_r$ of the standard point K in the base coordinate system. Then, the host control section 22 transforms (converts) the movement amount $dP_r$ of the standard point K into a movement amount $dP_r'$ of the standard point K in the Q coordinate system (step S12).

In step S13, the host control section 22 decides as a target position $P_{com}'$ in the Q coordinate system a position obtained by projecting the present position $P_r'$ to the predetermined movement path (see FIG. 6). In other words, the host control section 22 derives the target position $P_{com}'$ in the Q coordinate system by replacing the present position by a direction component included in the predetermined movement path. For example, in a case where the movement of the standard point K only in the x' direction is permitted, y' component and z' component of the target position $P_{com}'$ are zero, and x' component of the target position $P_{com}'$ is x' component of the movement amount $dP_r'$. For example, in a case where the movement of the standard point K only within x'y' plane is permitted, the z' component of the target position $P_{com}'$ is zero, and the x' component and y' component of the target position $P_{com}'$ are the x' component and y' component of the movement amount $dP_r'$.

In step S14, the host control section 22 performs inverse transform of the coordinates of the target position $P_{com}'$ in the Q coordinate system into those in the base coordinate system ($P_{com}=Q^{-1} \cdot P_{com}'$) to derive the target position $P_{com}$ in the base coordinate system.

In step S15, the host control section 22 generates the master arm position command value $T_{com}$ corresponding to the target position $P_{com}$ and the posture S. Then, the host control section 22 generates a slave arm position command value $T_{com}'$ based on the master arm position command value $T_{com}$ (step S16).

The master arm position command value $T_{com}$ (position and posture) and the slave arm position command value $T_{com}'$ (position and posture) have a pre-stored relation (predetermined relation). This "predetermined relation" is pre-stored in the host control section 22. Or, initial relative positions and postures of the wrist part 13 of the master arm 10M and the wrist part 13 of the slave arm 10S may be found, and stored in the host control section 22 as the predetermined relation. The host control section 22 is able to generate the slave arm position command value $T_{com}'$ based on the master arm position command value $T_{com}$ by use of, for example, a transform matrix representing the predetermined relation.

The host control section 22 outputs the master arm position command value $T_{com}$ generated in the above-described manner to the servo control section 23A of the master arm 10M. In addition, the host control section 22 outputs the slave arm position command value $T_{com}'$ generated in the above-described manner to the servo control section 23B of the slave arm 10S (step S17).

Receiving the master arm position command value $T_{com}$ as described above, the servo control section 23A of the master arm 10M drives each of the control shafts J in accordance with the master arm position command value $T_{com}$. Thus, the master arm 10M operates. Simultaneously, receiving the slave arm position command value $T_{com}'$, the servo control section 23B of the slave arm 10S drives each of the control shafts J in accordance with the slave arm position command value $T_{com}'$. Thus, the slave arm 10S operates. In the master arm 10M and the slave arm 10S which operate as described above, the relation of relative positions and postures of the wrist part 13 of the master arm 10M and the wrist part 13 of the slave arm 10S are maintained as the predetermined relation.

While the standard point K of the arm 10 is displaced, the above-described steps S8 to S17 are repeated at predetermined time intervals. While steps S8 to S17 are repeated, a deviation between the command angle $\theta_{com}$ corresponding to the master arm position command value $T_{com}$ and the detected shaft angle $\theta$ of each of the control shafts J, occurs. Therefore, each driving section 24 is subjected to a negative (inverse) feedback control so that this deviation becomes zero. In this way, the force applied to the arm 10 to move the master arm 10M by the teaching person is assisted.

When the standard point K of the master arm 10M reaches the teaching point desired by the teaching person, and the teaching person ceases to apply the external force, the deviation between the command angle $\theta_{com}$ and the detected shaft angle $\theta$ of each of the control shafts J becomes zero (NO in step S18), the operation of the master arm 10M stops, and generation of the assist force of the robot 1 stops. Simultaneously, the operation of the slave arm 10S stops.

When the master arm 10M ceases to be displaced, the host control section 22 causes the input device 62 to urge the teaching person to input a position teaching command. When the host control section 22 obtains the position teaching command input by the teaching person with the input device 62 (YES in step S19), the host control section 22 stores therein present (current) position information of the standard point K (or the position information of the master arm 10M and the position information of the slave arm 10S) as one teaching position (step S20), terminates the gravitational force compensation calculation (step S21), and returns the control parameters such as the gains in the control systems to original ones (step S22).

As described above, in the direct teaching method of the robot 1 (direct teaching method for the robot 1, method of direct teaching of the robot 1, method of directly teaching the robot 1) according to the present embodiment, the controller 6 specifies one of the two arms 10 as the master arm 10M and the other of the two arms 10 as the slave arm 10S, and causes the slave arm 10S to operate cooperatively with the master arm 10M so that the relation of relative positions and postures of the wrist part 13 of the master arm 10M and the wrist part 13 of the slave arm 10S are maintained as the predetermined relation, while the teaching person is directly applying a force to an arbitrary location of the master arm 10M including the tool 5 to move the master arm 10M to the desired teaching point. Then, the controller 6 stores therein the position information of the master arm 10M and the position information of the slave arm 10S at a time point when the master arm 10M has reached the desired teaching position.

In accordance with the above-described method, according to the movement of the master arm 10M being directly moved by the teaching person, the slave arm 10S automatically operates cooperatively with the master arm 10M so that the relation of relative positions and postures of the wrist part 13 of the master arm 10M and the wrist part 13 of the slave arm 10S are maintained as the predetermined relation. This makes it possible to omit a work which is complicated and requires expertise to adjust the relative positions and postures of the two arms 10, in the teaching work for the two arms 10. As a result, the teaching work is simple. Further, since the teaching person can see the relation of the positions and postures of the two arm 10, the teaching person can easily check the state of the two arms 10.

In accordance with the direct teaching method of the robot 1 according to the present embodiment, the controller 6 stores therein as the predetermined relation, the relation of the relative positions and postures of the wrist part 13 of the master arm 10M and the wrist part 13 of the slave arm 10S before the master arm 10M and the slave arm 10S move, and utilizes this relation for a teaching control.

In accordance with this, at the beginning of the teaching work, for example, the master arm 10M and the slave arm 10S have only to hold the workpiece to be handled. By doing this, the relation of the relative positions and postures of the wrist part 13 of the master arm 10M and the wrist part 13 of the slave arm 10S can be set. As a result, the teaching work can be easily performed.

In accordance with the direct teaching method of the robot 1 according to the present embodiment, the standard point K is defined in the master arm 10M, and it is possible to select the restriction mode in which the movement path of the standard point K is restricted to the predetermined movement path or the free mode in which the movement of the standard point K is not restricted to the predetermined movement path.

Since the restriction mode or the free mode can be selected in the direct teaching, the teaching person can select the mode depending on the situation. Thus, the master arm 10M and/or the tool 5 can be easily moved according to the intention of the teaching person.

In accordance with the direct teaching method of the robot 1 according to the present embodiment, while the teaching person is moving the master arm 10M, the controller 6 repeatedly performs a series of operations for each of the control shafts J of the master arm 10M, until the deviation between the shaft angle (command angle $\theta_{com}$) corresponding to the master arm position command value $T_{com}$ and the detected shaft angle θ becomes zero, the series operations including detecting the shaft angle $\theta_1$ of each of the control shafts J of the master arm 10M, deriving the present position $P_r$ of the standard point K based on the shaft angle $\theta_1$, generating the master arm position command value $T_{com}$ in which a position obtained by projecting the present position $P_r$ to the predetermined movement path (movement direction) is the target position $P_{com}$, generating the slave arm position command value $T_{com}'$ based on the master arm position command value $T_{com}$ and the predetermined relation, driving the control shaft J of the slave arm 10S in accordance with the slave arm position command value $T_{com}'$, and driving the control shaft J of the master arm 10M in accordance with the master arm position command value $T_{com}$, and stores therein the position information of at least one of the master arm 10M and the slave arm 10S, after the deviation has reached zero. The movement path of the standard point K of the master arm 10M of the robot 1 is restricted to the predetermined movement path during the direct teaching.

In the above-described control, during the direct teaching performed for the robot 1, the controller 6 detects each of the shaft angles $\theta_1$ of the master arm 10M, calculates the present position $P_r$ based on each of the shaft angles $\theta_1$, derives the target position $P_{com}$ by projecting the present position $P_r$ to the predetermined movement path (movement direction), and generates the master arm position command value $T_{com}$ based on the target position $P_{com}$. The controller 6 repeats the above-described calculation (computation).

During the direct teaching performed for the robot 1, each of the control shafts J of the master arm 10M is driven in accordance with the master arm position command value $T_{com}$ and thus the master arm 10M operates to assist the external force applied to the master arm 10M or the tool 5 by the teaching person. Since the master arm position command value $T_{com}$ is changed continuously based on each of the shaft angles $\theta_1$ of the master arm 10M which changes continuously, the standard point K does not move against the teaching person's intention. Therefore, in a case where the standard point K is positioned in a desired teaching position, the fine adjustment of the position (s) of the master arm 10M and/or the tool 5 can be easily performed. Further, since the robot 1 can perform its existing function to perform the above-described operations, an external force detecting unit which detects the external force applied to the master arm 10M and a control therefor can be omitted.

During the direct teaching performed for the robot 1, the movement path of the standard point K is restricted to the predetermined movement path (predetermined movement direction). Therefore, even in a case where the direction of the external force applied to the master arm 10M or the tool 5 by the teaching person does not conform to the movement direction of the standard point K, the standard point K moves along the predetermined movement path. This makes it easy to move the standard point K to a position desired by the teaching person. In addition, since the operation of each of the control shafts J of the master arm 10M which is being subjected to the direct teaching assists the force applied to the master arm 10M or the tool 5 by the teaching person, the teaching person can move with a relatively small force, for example, the shaft (e.g., the first control shaft J1 which is closer to the base end) with a high static frictional force. Although in the present embodiment, the direct teaching method of the robot 1 including 4 control shafts J1 to J4 of one master arm 10M has been described, the number of the control shafts J of the master arm 10M is not limited to the above.

In the direct teaching method of the robot 1, according to the above-described embodiment, the position gains and speed gains of the control shafts J of the master arm 10M can be set to desired values. In the present embodiment, the gains of the positions and speeds of the control shafts J whose operations are permitted during the direct teaching are set to sufficiently small values.

This allows the shafts to be easily displaced by the force applied to the master arm 10M or the tool 5 by the teaching person. In addition, the assist force can be generated for a slight force applied to the master arm 10M or the tool 5 by the teaching person.

In the direct teaching method of the robot 1, according to the above-described embodiment, the gravitational force compensation calculation is performed for at least one (third control shaft J3) of the control shafts J of the master arm 10M and calculation data is added to the torque command value (driving command value) of this control shaft.

This makes it possible to accurately perform the gravitational force compensation corresponding to a change in the posture of the control shaft J of the master arm 10M, during the direct teaching performed for the robot 1.

In the direct teaching method of the robot 1, according to the above-described embodiment, the initial posture S of the tool 5 is derived based on the shaft angles $\theta_0$ of the control shafts J of the master arm 10M before the teaching person moves the master arm 10M, and the master arm position command value $T_{com}$ is generated so that the initial posture S of the tool 5 is maintained while the teaching person is moving the master arm 10M.

During the direct teaching performed for the robot 1, only the master arm 10M can be moved while maintaining the initial posture S of the tool 5. In other words, only the position of the tool 5 can be changed, while maintaining the initial posture S of the tool 5. Although in the above-described embodiment, the initial posture S of the tool 5 is maintained during the direct teaching performed for the robot 1, the position and posture of the tool 5 may be changed according to the movement of the master arm 10M or only the posture S of the tool 5 may be changed with the position of the tool 5 fixed during the direct teaching performed for the robot 1.

In the direct teaching method of the robot 1, according to the above-described embodiment, as shown in FIG. 7, the predetermined movement path of the standard point K is defined on a straight line parallel to the x-y plane in xyz three orthogonal axes in the base coordinate system. However, in the present embodiment, the predetermined movement path (movement direction) is not limited to this, and is suitably set based on a relation between the initial position $P_s$ of the standard point K and the next teaching position.

For example, the predetermined movement path of the standard point K may be defined on a straight line parallel to one of xyz three orthogonal axis directions in the base coordinate system or on a straight line parallel to one of xyz three orthogonal axis directions in the tool coordinate system. For example, the predetermined movement path of the standard point K may be defined on a plane parallel to a plane defined by a combination of two of xyz three orthogonal axes in the base coordinate system or on a plane parallel to a plane defined by a combination of two of xyz three orthogonal axes in the tool coordinate system. Further, for example, the predetermined movement path of the standard point K may be defined on a rotation trajectory which is around one of the xyz three orthogonal axes in the base coordinate system or on a rotation trajectory which is around one of the xyz three orthogonal axes in the tool coordinate system.

In the direct teaching method of the robot 1, according to the above-described embodiment, to generate the master arm position command value $T_{com}$ from the present position $P_r$, the movement vector V on the predetermined movement path is derived, the coordinate transform matrix Q which transforms the base coordinate system into the Q coordinate system so that the movement vector V becomes parallel to one of the x'y'z' three orthogonal axes in the new Q coordinate system is derived, the coordinates of the present position $P_r$ of the standard point K in the base coordinate system are transformed into those in the Q coordinate system, the position obtained by projecting the present position $P_r'$ in the Q coordinate system to the predetermined movement path is decided as the target position $P_{com}'$ in the Q coordinate system, and the coordinates of the target position $P_{com}'$ are transformed into those in the base coordinate system to derive the target position $P_{com}$.

By utilizing the coordinate transform, the calculation performed by the controller 6 can be simplified.

As described above, in the direct teaching method of the robot 1 according to the above-described embodiment, the direct teaching work can be easily performed for the robot 1 including the plurality of arms 10, while operating the plurality of arms 10 in association with each other.

Although the preferred embodiment of the present embodiment has been described above, the above-described configuration can be changed as follows, for example.

Although in the above-described embodiment, the robot 1 is the dual-arm robot including the two arms 10A, 10B, the robot 1 may include three or more arms 10. In this case, in step S1, the controller 6 specifies one of the plurality of arms 10 as the master arm 10M, and specifies at least one of the remaining arms 10 as the slave arm 10S. In a case where two or more slave arms 10S are provided, the controller 6 contains therein as the predetermined relation, the relative positions and postures of the wrist part 13 of the master arm 10M and the wrist part 13 of each of the slave arms 10S. During the direct teaching performed for the robot 1, the controller 6 causes each of the slave arms 10S to operate cooperatively with the master arm 10M so that the relative positions and postures of the wrist part 13 of the master arm 10M and the wrist part 13 of each of the slave arms 10S becomes the predetermined relation. Note that the arm 10 which is not specified as the master arm 10M or the slave arm 10S may be fixed (remain unmoved) during the direct teaching performed for the robot 1.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

REFERENCE SIGNS LIST

1: robot
5: tool
6: controller
10, 10A, 10B: robot arm
22: host control section
22b: gravitational force compensation calculator
23 (23A, 23B): servo control section
24 (24A, 24B): driving section
26: amplifier circuit
62: input device
E (E1 to E4): encoder
J (J1 to J4): control shaft
K: standard point
M (M1 to M4) servo motor

The invention claimed is:

1. A direct teaching method of a robot, the robot including a plurality of robot arms, the direct teaching method comprising:

specifying one of the plurality of robot arms as a master arm and specifying as a slave arm at least one of the plurality of robot arms which is other than the master arm;

deriving relative positions and postures of a wrist part of the master arm located at an initial position and a wrist part of the slave arm located at an initial position and storing the relative positions and postures as a predetermined relation;

causing the slave arm to operate cooperatively with the master arm so that the relative positions and postures of the wrist part of the master arm and the wrist part of the slave arm become the predetermined relation, while a teaching person is directly applying a force to an arbitrary location of the master arm including a tool, to move the master arm from the initial position to a desired teaching position; and at a time point when the master arm has reached the desired teaching position, storing position information of the master arm and position information of the slave arm.

2. The direct teaching method of the robot according to claim 1,
wherein a standard point is defined in the master arm, and a restriction mode in which a movement path of the standard point is restricted to a predetermined movement path, or a free mode in which the movement path of the standard point is not restricted to the predetermined movement path, is selectable.

3. The direct teaching method of the robot according to claim 2, further comprising:
restricting the movement path of the standard point to the predetermined movement path;
while the teaching person is moving the master arm, repeating a series of operations for each of control shafts of the master arm until a deviation between a shaft angle corresponding to a master arm position command value and a detected shaft angle becomes zero, the series of operations including detecting the shaft angle of each of the control shafts of the master arm, deriving a present position of the standard point based on the shaft angle, generating the master arm position command value in which a position obtained by projecting the present position to the predetermined movement path is a target position, generating a slave arm position command value based on the master arm position command value and the predetermined relation, driving each of control shafts of the slave arm based on the slave arm position command value, and driving each of the control shafts of the master arm based on the master arm position command value; and
storing the position information of the master arm and the position information of the slave arm after the deviation has reached zero.

4. The direct teaching method of the robot according to claim 3,
wherein a position gain and a speed gain of each of the control shafts of the master arm are set to desired values.

5. The direct teaching method of the robot according to claim 3, further comprising:
performing a gravitational force compensation calculation for at least one of the control shafts of the master arm, and adding a value of the gravitational force compensation calculation to a torque command value of the control shaft.

6. The direct teaching method of the robot according to claim 3, further comprising:
deriving an initial posture of the tool attached on the master arm based on the shaft angle of each of the control shafts of the master arm before the teaching person moves the master arm; and
generating the master arm position command value so that the initial posture of the tool is maintained while the teaching person is moving the master arm or the tool attached on the master arm.

7. The direct teaching method of the robot according to claim 3,
wherein the predetermined movement path of the standard point is defined on a straight line parallel to one of three orthogonal axis directions in a xyz base coordinate system or on a straight line parallel to one of three orthogonal axis directions in a xyz tool coordinate system.

8. The direct teaching method of the robot according to claim 3,
wherein the predetermined movement path of the standard point is defined on a plane parallel to a plane defined by a combination of two of three orthogonal axes in a xyz base coordinate system or on a plane parallel to a plane defined by a combination of two of three orthogonal axes in a xyz tool coordinate system.

9. The direct teaching method of the robot according to claim 3,
wherein the predetermined movement path of the standard point is defined on a rotation trajectory which is around one of three orthogonal axes in a xyz base coordinate system or on a rotation trajectory which is around one of three orthogonal axes in a xyz tool coordinate system.

10. The direct teaching method of the robot according to claim 3,
wherein generating the master arm position command value from the present position includes:
deriving a movement vector on the predetermined movement path;
deriving a coordinate transform matrix which transforms a base coordinate system into a new xyz coordinate system so that the movement vector becomes parallel to one of three orthogonal axes in the new xyz coordinate system;
transforming coordinates of the present position of the standard point in the base coordinate system into coordinates in the new xyz coordinate system; and
deciding as a target position in the new xyz coordinate system, a position obtained by projecting the present position in the new xyz coordinate system to the predetermined movement path, and transforming coordinates of the target position in the new xyz coordinate system into coordinates in the base coordinate system to derive the target position.

* * * * *